United States Patent [19]

Yasumune et al.

[11] Patent Number: 4,546,595
[45] Date of Patent: Oct. 15, 1985

[54] METHOD AND APPARATUS FOR PACKAGING ARTICLES OF VARIOUS SIZES WITH A CONTINUOUS LENGTH OF HEAT SEALABLE FILM

[75] Inventors: Masaru Yasumune, Mihara; Junsaku Yamada; Sumiaki Kurokawa, both of Onomichi, all of Japan

[73] Assignees: Kabushiki Kaisha Furukawa Seisakusho, Tokyo; Furukawa Kogyo Kabushiki Kaisha, Hiroshima, both of Japan

[21] Appl. No.: 624,715

[22] Filed: Jun. 26, 1984

[30] Foreign Application Priority Data

Jun. 30, 1983 [JP] Japan .................. 58-119878

[51] Int. Cl.⁴ .............................................. B65B 9/06
[52] U.S. Cl. ...................................... 53/450; 53/550
[58] Field of Search ................ 53/450, 451, 550, 551, 53/552, 66

[56] References Cited

U.S. PATENT DOCUMENTS

| | | | |
|---|---|---|---|
| 3,338,023 | 8/1967 | Lazenby | 53/550 X |
| 3,585,623 | 6/1971 | Laukaitis | 53/550 X |
| 3,672,120 | 6/1972 | Heinzer | 53/550 |
| 4,004,400 | 1/1977 | Anderson et al. | 53/550 |
| 4,305,240 | 12/1981 | Grevich et al. | 53/550 X |
| 4,381,637 | 5/1983 | Ballestrazzi et al. | 53/550 X |

Primary Examiner—Horace M. Culver
Attorney, Agent, or Firm—Ladas & Parry

[57] ABSTRACT

Articles to be packaged are introduced at a constant rate into a continuous length of heat sealable film which is being folded into approximately tubular shape while being fed at a speed selected in accordance with the size of the articles. The side edges of the folded film are heat sealed over the successive articles received therein at longitudinal spacings. A package conveyor receives the side sealed film, together with the articles contained therein, for transporting the same along a linear track between an upper sealer conveyor carrying a series of heater bar assemblies and a lower sealer conveyor carrying a series of anvil bar and cutter assemblies. The heater bar assemblies and the anvil bar and cutter assemblies coact to engage therebetween the side sealed film, at points intermediate the articles received therein, and to cut the film, at the entrance end of the package conveyor. Each coacting pair of heater bar assembly and anvil bar and cutter assembly seals one end of each severed piece of film during its travel on the package conveyor. The speed at which the film is fed while being folded and receiving the articles can be variously determined, within a range not exceeding the predetermined running speed of the package conveyor, for packaging various size articles without waste of the film.

19 Claims, 14 Drawing Figures

METHOD AND APPARATUS FOR PACKAGING ARTICLES OF VARIOUS SIZES WITH A CONTINUOUS LENGTH OF HEAT SEALABLE FILM

BACKGROUND OF THE INVENTION

This invention relates to the packaging of articles with a continuous length of heat sealable film, that is, a film that is sealable by heat and pressure, which may be either of a single material or a lamination of two or more plies of similar or dissimilar materials. The invention is directed more specifically to a method of, and apparatus for, packaging articles of various sizes without waste of the film.

The packaging of foods and other articles with heat sealable film is carried out by a "instant sealing method" or an "extended period sealing method". The "instant sealing method" calls for the use of a rotary sealer which rotates constantly, while being heated to a required temperature, for instantly heat sealing thin films. Although well suited for efficiently packaging relatively small sized articles, this technique is not adoptable for the packaging of larger or heavier articles with thicker films or laminations of dissimilar materials. The "extended period sealing method" which is necessary for these packaging media as most of them requires the application of heat and pressure for a longer period of time.

A packaging line employing the "extended period sealing method" has been known. Fed at a constant speed, a continuous length of heat sealable film is folded longitudinally over successive articles with constant spacings therebetween. The lapping side edges of the folded film are heat sealed over the articles. Thereafter, the folded and side sealed film is sealed at points intermediate the successive articles received therein through the "extended period sealing method". The film is so sealed while traveling along a linear track by endless rows of end sealing means.

A problem has existed with this conventional type of packaging line. The packages produced as above have been constant in length regardless of the size of the articles. The length of each package has been determined by the spacings of the end sealing means for heat sealing the film at points intermediate thereof and has not been variable without changing the spacings of the end sealing means. This of course involves waste of the film as spacings between the end sealing means have been determined in consideration of maximum size articles to be packaged. To adjust the spacings to each size of articles is to add to human task and to decrease the production of the machine.

SUMMARY OF THE INVENTION

The present invention overcomes the above inconvenience in packaging articles of various sizes with a continuous length of heat sealable film and makes possible the production of packages having a length suiting the size of the articles contained therein.

Summarized in one aspect thereof, the invention provides an improved packaging method wherein a length of heat sealable film is continuously folded into approximately tubular shape while being fed longitudinally at a speed selected in accordance with the size of the articles to be packaged. The articles are introduced into the film being folded, at a constant rate regardless of the selected traveling speed of the film, with longitudinal spacings between the articles received in the folded film. The side edges of the folded film are heat sealed together over the successive articles received therein. The side sealed film, together with the articles contained therein, is then transferred onto a linear track for transportion thereon at a preassigned speed at least equal to the selected speed at which the film is fed while being folded and receiving the articles. At the entrance end of the linear track the film is engaged, at points intermediate the articles contained therein, by an endless row of end sealing means movable along the linear track at the aforesaid pressigned speed. Also at the entrance end of the linear track the film is cut off at a point immediately behind each end sealing means approximately concurrently with the engagement thereof by the end sealing means. One end of each severed piece of film, containing one article, is then heat sealed by the end sealing means during the travel thereof along the linear track.

Further, as required, each severed piece of side and end sealed film containing one article may then be transferred from the first recited to a second linear track for transportion thereon at a speed determined in accordance with the selected speed at which the film is fed while being folded and receiving the articles. Another end of each piece of film may be heat sealed during travel along the second linear track.

Thus, for packaging articles of various sizes, the speed at which the film is fed while being folded and receiving the articles therein may be suitably determined within a range not exceeding the preassigned speed of transportation of the severed pieces of film along the linear track. The packages produced will be longest when the selected feed speed of the film equals the preassigned speed of transportation of the severed pieces of film along the linear track, and will become shorter with a decrease in the film feed speed. The production rate of the packages remains unchanged irrespective of the size of the articles contained therein because the speed of transportation of the severed pieces of film along the linear track is constant. It will therefore be seen that the invention makes possible the production at an unvarying rate of packages having a length suiting the size of the articles contained therein, without the need for changing the spacings between the end sealing means.

Another aspect of the invention concerns apparatus for carrying the above described method into practice. The apparatus comprises feed means for feeding a continuous length of heat sealable film at a speed selected in accordance with the size of articles to be packaged. While being thus fed at the selected speed, the film is folded into approximately tubular shape by a folder and receives from infeed means the successive articles at a constant rate. Further the side edges of the folded film are heat sealed together by side sealing means. For the provision of the desired linear track there is provided a package conveyor having an entrance end arranged to receive the side sealed film together with the articles received therein, for transportation at the preassigned speed. The package conveyor has a series of apertures formed therein at constant longitudinal spacings. Disposed on opposite sides of the package conveyor are first and second sealer conveyors running parallel thereto at the same speed and in the same direction therewith. The first sealer conveyor carries a plurality of heater bar assemblies at constant longitudinal spacings whereas the second sealer conveyor carries a plurality of anvil bar assemblies at constant longitudinal spacings. The heater bar assemblies coact with the respective anvil bar assemblies to engage the side sealed film, at points intermediate the articles received therein, at the entrance end of the package conveyor through the respective apertures therein and to end seal the film by heat and pressure during travel along the package conveyor. Further included are cutter means for cutting off the side sealed film, at a point immediately behind each coacting pair of heater bar and anvil bar assemblies, approximately concurrently with the engagement thereof by the coacting pair of heater bar and anvil bar assemblies.

All that is required for packaging articles of various sizes without wasteful use of the film is to appropriately select the speed at which the film is fed by the feed means. The selected speed should not, of course, exceed the preassigned speed of the package conveyor. The feed means may take the form of a pair of opposed endless belts in frictional contact with the film.

In a preferred embodiment the anvil bar assemblies are structurally associated with the cutter means into anvil bar and cutter assemblies. Each anvil bar and cutter assembly comprises a cutter disposed behind the anvil bar for cutting the film at the entrance end of the package conveyor. Each coacting pair of heater bar and anvil bar holds the trailing end of the severed piece of film in engagement therebetween throughout the length of the package conveyor for sealing the film end by the "extended period sealing method". If the selected film feed speed is less than the preassigned speed of the package conveyor, each severed piece of film will move forwardly away from the continuous length of the film upon being cut therefrom at the entrance end of the package conveyor. It is therefore essential that the film be cut off behind each coacting pair of heater bar and anvil bar approximately concurrently with the engagement of the film by the coacting pair of heater bar and anvil bar at the entrance end of the package conveyor.

The above and other features and advantages of the present invention and the manner of attaining them will become more apparent, and the invention itself will best be understood, from a study of the following description and appended claims, with reference to the attached drawings showing the preferred embodiment of the invention.

BRIEF DESCRIPTION OF THE DRAWINGS

In the accompanying drawings

DETAILED DESCRIPTION OF THE INVENTION

General

Figure 1:
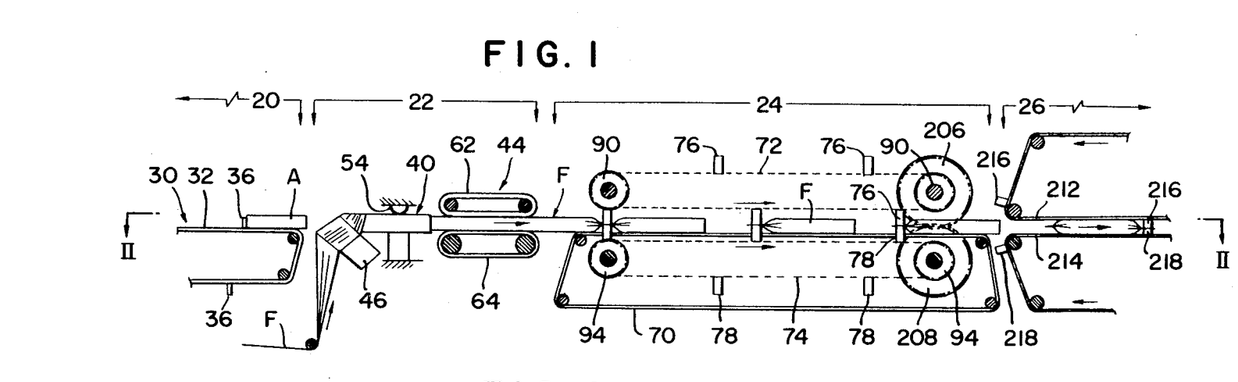
FIG. 1 is a diagrammatic side elevation, partly broken away for illustrative convenience, of the complete packaging line embodying the novel concepts of the present invention.
Figure 2:
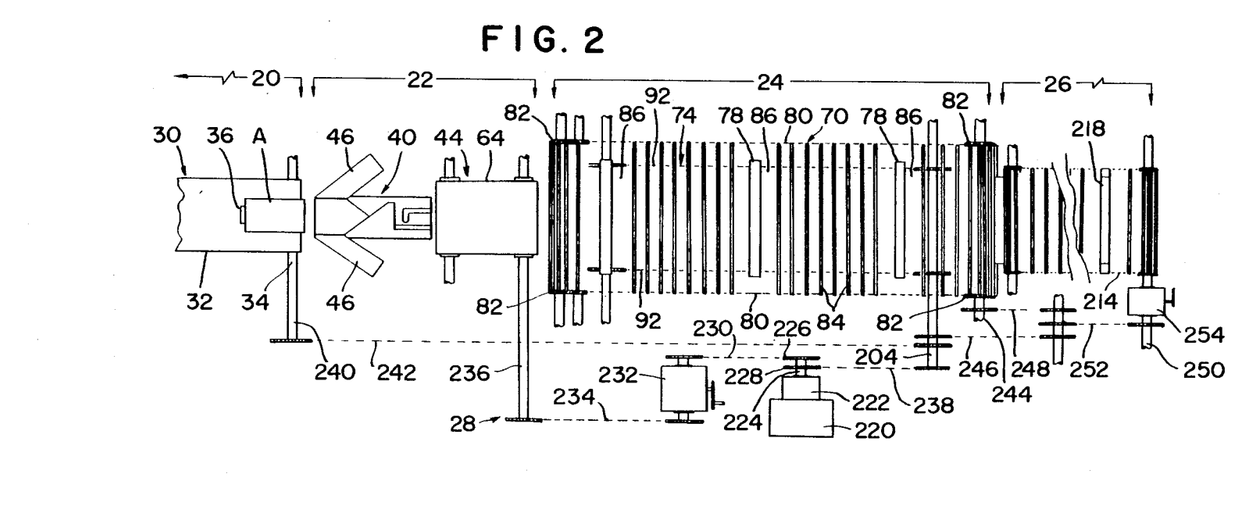
FIG. 2 is a diagrammatic horizontal section through the packaging line of FIG. 1, taken along the line II—II therein, the view additionally showing a drive mechanism for the conveyors and other moving parts of the packaging line.

The general organization of the packaging line will become apparent from a consideration of FIGS. 1 and 2. It comprises the following four sections, arranged sequentially in the order of the enumeration:

1. An infeed section 20 for infeeding a succession of articles A to be packaged;
2. A folder section 22 for folding a continuous length of heat sealable film F into approximately tubular shape and for heat sealing the side edges of the folded film over the successive articles A received therein;
3. A first end sealer section 24 for cutting the folded and side sealed film F at points intermediate the articles received therein and for heat sealing one end of each severed piece of film; and
4. A second end sealer section 26 for heat sealing another end of each severed piece of film.

As seen in FIG. 2, the illustrated apparatus further comprises a drive mechanism 28 for driving the conveyors and other moving parts of the packaging line at desired speeds. The drive mechanism 28 is equipped to adjustably vary the speed at which the film F is fed through the folder section 22, up to a limit equal to a predetermined speed at which the severed pieces of article containing film travel through the first end sealer section 24, for the production of packages having a length suiting the size of the articles packaged.

The following is a more extensive discussion of the above recited infeed section 20, folder section 22, first end sealer section 24, second end sealer section 26, and drive mechanism 28, under the respective headings. The operational description of the complete apparatus will follow the discussion of the packaging line sections and drive mechanism.

Infeed Section

At the upstream end of the packaging line there is the infeed section 20 comprising an infeed conveyor 30. As will be seen also from FIGS. 3 and 4, the infeed conveyor 30 is shown as a usual belt conveyor having an endless belt 32 moving over pulleys 34. The endless belt 32 has a series of pushers 36 fixedly mounted thereon at constant longitudinal spacings for pushing the successive articles A forwardly. The pitch distances between these pushers on the infeed conveyor determine those of the articles A as they are delivered to the folder section 22.

Folder Section

While the folder section 22 appears fully in FIGS. 1 and 2, FIGS. 3 and 4 better illustrate its details. Included in this section is a folder 40 for folding the continuous length of heat sealable film F into approximately tubular shape as the film is pulled therethrough from its roll on a reel 42 by a film feed mechanism 44. The folder 40 is boxlike in shape, open at both ends, and has a pair of angled wings 46 on both sides for guiding the film F into the box. Passing through the boxlike folder 40, the film F is tubed by enveloping the successive articles A delivered from the infeed conveyor 30 at constant spacings. The folder 40 has a pair of side edges 48 and 50 on its top which are partly in lapping relation with each other. A gap exists between these lapping edge portions to allow one side edge F1 of the film F to pass therebetween. Traveling under the underlapping side edge 50 of the folder 40, the other side edge F2 of the film is directed thereover through an L shaped slot 52 cut therein. Thus the two side edges F1 and F2 of the film meet into a lapping relation just downstream of the slot 52.

Figure 3:
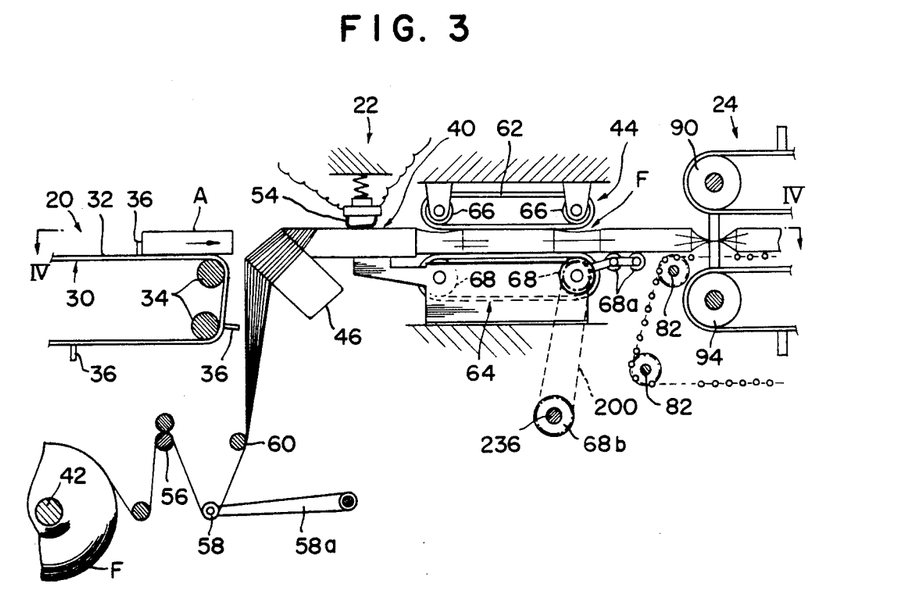
FIG. 3 is an enlarged side elevation of the folder section of the packaging line of FIG. 1, the folder section being shown together with the neighboring parts of the infeed section and first end sealer section.
Figure 4:
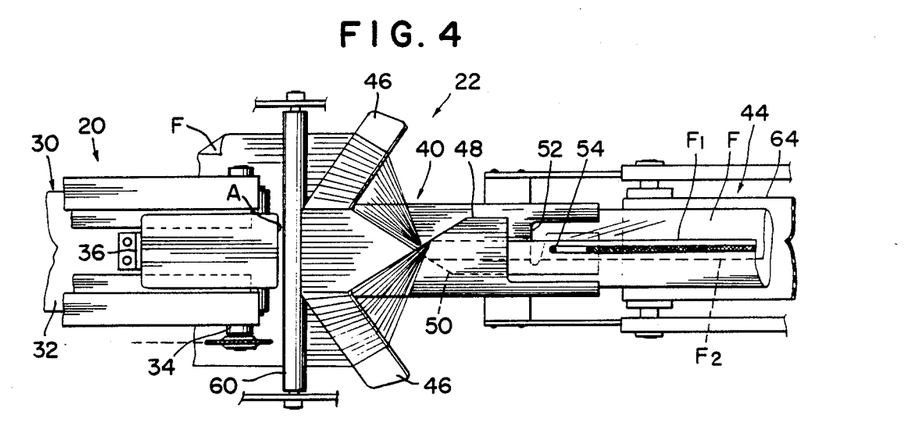
FIG. 4 is a horizontal section through the showing of FIG. 3, taken along the line IV—IV therein.

Overlying the folder 40 is an electric heater 54 for heat sealing the lapping side edges F1 and F2 of the folded film F. The film is thus side sealed at the folder section 22 over the articles A received therein.

FIG. 3 further reveals the path of the film F from its roll on the reel 42 to the folder 40. The film is directed through nip rolls 56, a tension roll 58 supported by a swingable lever 58a and a guide roll 60.

As shown also in FIG. 3, the aforesaid film feed mechanism 44 comprises a pair of opposed endless belts 62 and 64 lying just downstream of the folder 40 and operating over respective pairs of pulleys 66 and 68. To the rear one of the two pulleys 68 is connected two guide rollers 68a for supporting the film F between the folder section and the first end sealer section 24. Furthermore, the rear pulley 68 is connected to a pulley 68 fixed to a shaft 236 through a belt 200. The endless belts 62 and 64 frictionally engage therebetween the folded and side sealed film F containing the articles A. The film feed mechanism 44 performs the important function of adjustably varying the film feed speed in accordance with the size of the articles to be packaged, as will be later explained in more detail.

The operating principles of the folder section 22 of the above configuration have been known, however, and have been utilized for the production of envelopes from a continuous web of paper. Japanese Utility Model Publication No. 53-7974 corresponding to U.S. Pat. No. 4,784,822 discloses similar principles. The present invention gains novelty and utility by combining this folder section with the other parts of the packaging line.

First End Sealer Section

Figure 12:
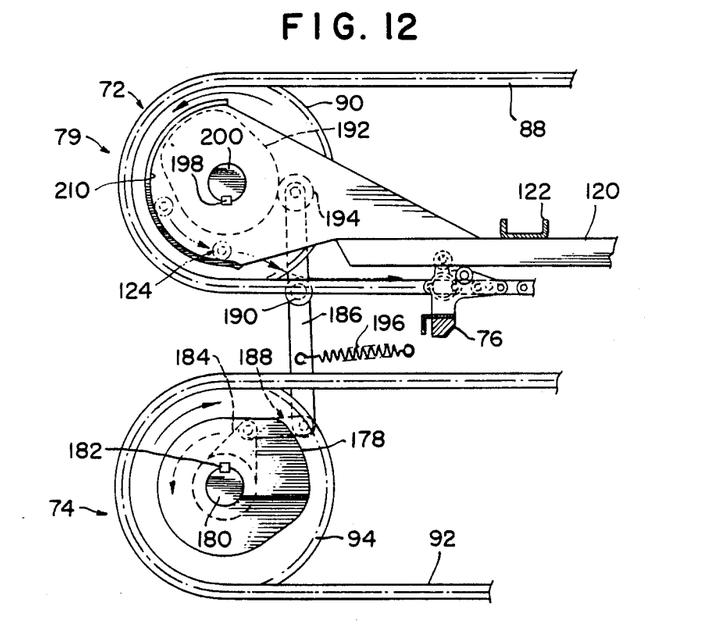
FIG. 12 is a fragmentary side elevation of the actuating cam mechanism included in the first end sealer section for actuating the anvil bar and cutter assemblies.

With reference to FIGS. 1 and 2 the first end sealer section 24 comprises:

1. An apertured package conveyor 70 for transporting the incompletely packaged articles at a preassigned speed not less than the selected speed at which the film is fed by the film feed mechanism 44, the package conveyor providing a linear, elongate track necessary for heat sealing one end of each incomplete package by the "extended period sealing method";
2. An upper sealer conveyor 72 disposed above the package conveyor 70 and running parallel thereto at the same speed and in the same direction therewith;
3. A lower sealer conveyor 74 disposed under, or within, the package conveyor 70 and also running parallel thereto at the same speed and in the same direction therewith;
4. A plurality of, five in the illustrated embodiment, heater bar assemblies 76 pivotally mounted on the upper sealer conveyor 72 at constant longitudinal spacings;
5. A plurality of anvil bar and cutter assemblies 78 pivotally mounted on the lower sealer conveyor 74 at constant longitudinal spacings and coacting with the respective heater bar assemblies 76 on the upper sealer conveyor 72 for cutting off the folded and side sealed film F at the entrance end of the package conveyor 70 through the apertures defined therein and for heat sealing one end of each severed piece of film during travel along the upper flight (linear track) of the package conveyor;
6. An actuating cam mechanism 79 as shown in FIG. 12, for actuating the successive anvil bar and cutter assemblies 78 at the entrance end of the package conveyor 70.

Given hereafter is a more detailed description of the above listed conveyors, assemblies and mechanism constituting the first end sealer section 24.

PACKAGE CONVEYOR

Figure 5:
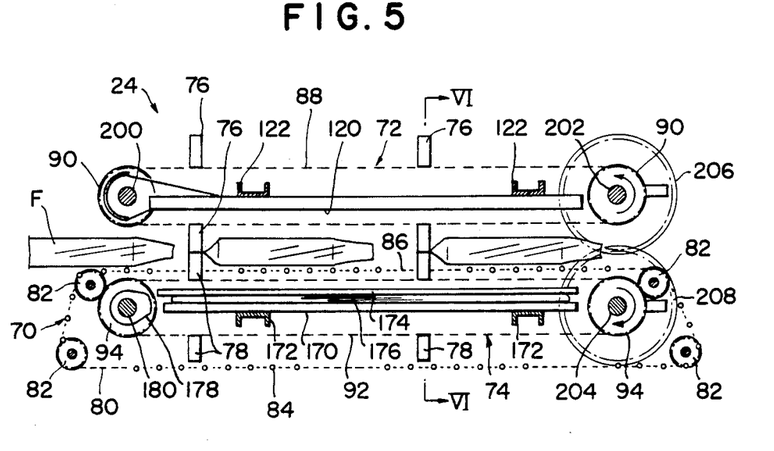
FIG. 5 is an enlarged, diagrammatic side elevation showing the first end sealer section of the packaging line on an enlarged scale.

As will be seen from both FIGS. 2 and 5, the package conveyor 70 is a chain conveyor having a pair of endless chains 80 each extending over four sprockets 82. A multiplicity of spaced apart crossbars 84 interconnect the two endless chains 80. Not all the spacings between these crossbars are constant, but some are greater than the others to provide the required apertures at 86. The anvil bar and cutter assemblies 78 on the lower sealer conveyor 74 partly project outwardly or upwardly through the apertures 86 in the package conveyor 70 when traveling along the upper flight of the package conveyor.

UPPER SEALER CONVEYOR

The upper sealer conveyor 72 also takes the form of a chain conveyor having a pair of endless chains 88 as shown in FIG. 5. Each endless chain 88 extends over a pair of sprockets 90.

LOWER SEALER CONVEYOR

The lower sealer conveyor 74 is also shown as a chain conveyor having a pair of endless chains 92 as shown in FIGS. 2 and 5. Each endless chain 92 extends over a pair of sprockets 94. As will be understood from FIG. 5, the total length of the package conveyor 70 must be longer than that of the lower sealer conveyor 74 disposed internally thereof. The difference in length therebetween is equal to the pitch distance between any two adjacent anvil bar and cutter assemblies 78 on the lower sealer conveyor 74. Each anvil bar and cutter assembly 78 is therefore allowed to project upwardly through one of the apertures 86 in the package conveyor 70 at its entrance end and to retract therefrom at its exit end.

HEATER BAR ASSEMBLIES

Figure 6:
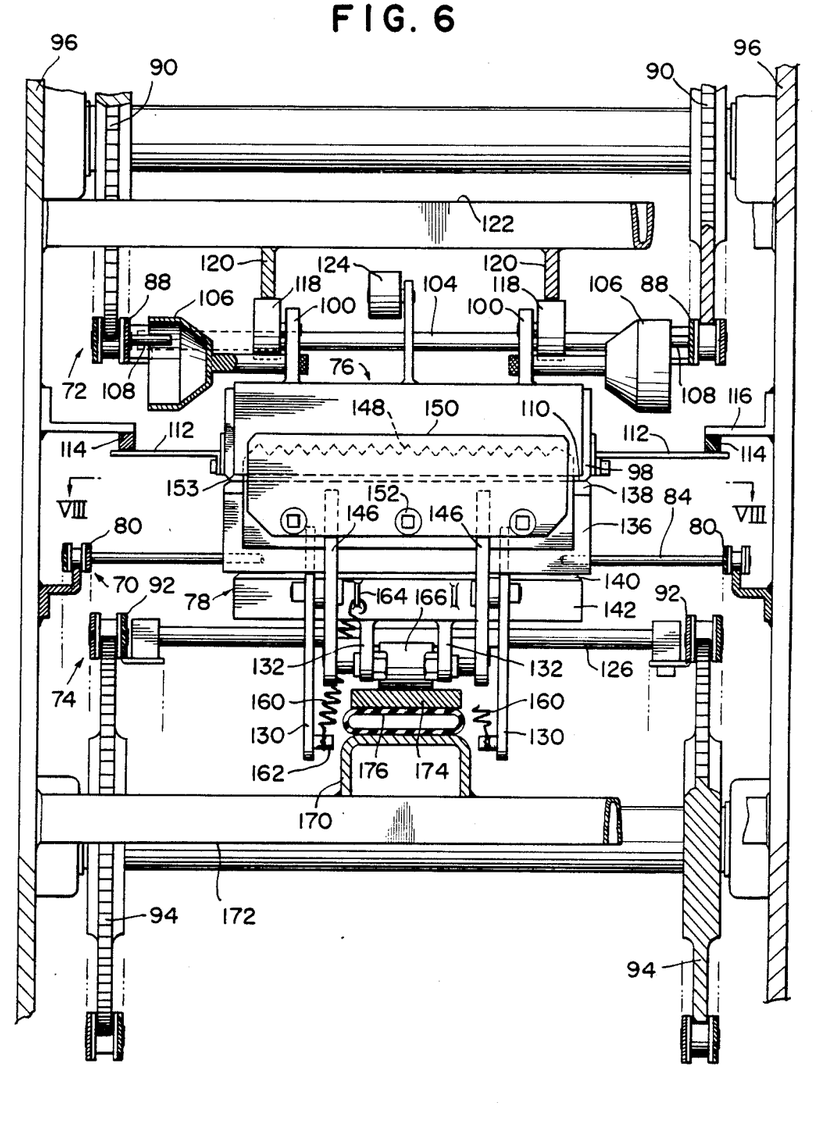
FIG. 6 is a still more enlarged, fragmentary vertical section through the first end sealer section, taken along the line VI—VI of FIG. 5, the view showing in particular one of the coacting pairs of heater bar assemblies and anvil and cutter assemblies.
Figure 7:
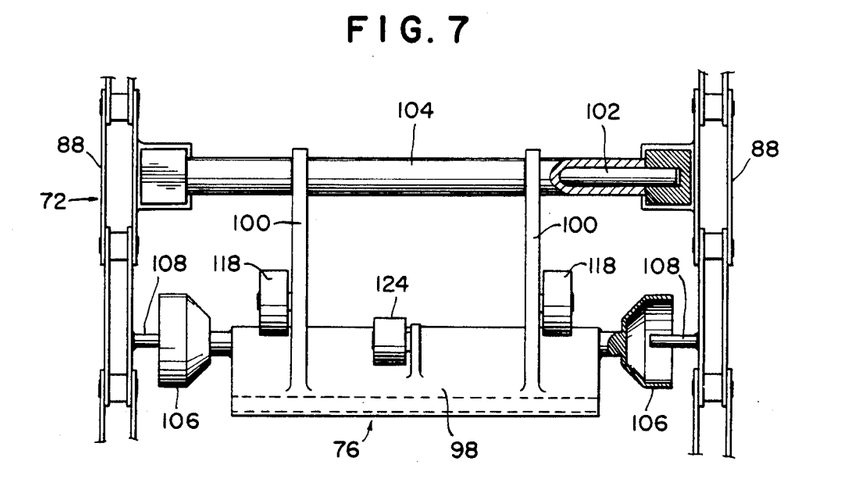
FIG. 7 is a fragmentary plan, partly sectioned for clarity, of one of the heater bar assemblies of the first end sealer section.
Figure 8:
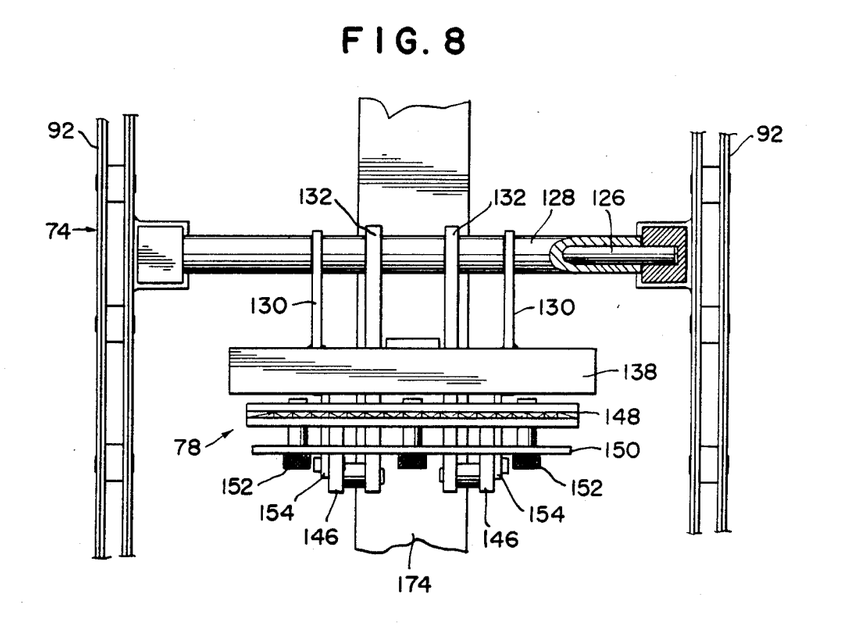
FIG. 8 is a fragmentary plan view, partly sectioned for clarity, of one of the anvil bar and cutter assemblies of the first end sealer section, the view being shown as seen in the direction indicated by the arrows VIII in FIG. 6.

One of the heater bar assemblies 76 on the upper sealer conveyor 72 is illustrated in detail together with the associated one of the anvil bar and cutter assemblies 78 on the lower sealer conveyor 74 in FIG. 6 and by itself in FIG. 7. It will be observed from FIG. 6 that the sprockets carrying the three conveyors 70, 72 and 74 of the first end sealer section 24 are mounted on shafts journaled in a pair of opposed side walls 96.

Each heater bar assembly 76 comprises a heater bar 98 disposed between the pair of endless chains 88 of the upper sealer conveyor 72 and generally oriented transversely thereof. Ridigly coupled to the heater bar 98 each at one end, a pair of support arms 100 have their opposite ends pivoted on a crossbar 102 (FIG. 7) of the upper sealer conveyor 72 via a sleeve 104. The heater bar 98 is therefore pivotable relative to the first sealer conveyor 72 about an axis extending transversely thereof. For limiting such pivotal motion of the heater bar 98 a pair of cups 106 are attached to its opposite ends so as to be open away therefrom. The cups 106 fit with considerable clearance over respective stop pins 108 rigidly anchored to the upper sealer conveyor chains 88.

The heater bar 98 carries electric heating wire 110 on its surface to be held opposite to the associated one of the anvil bar and cutter assemblies 78. The heating wire 110 has its opposite extremities electrically connected to a pair of rodlike terminals 112 extending in the opposite directions from both sides of the heater bar 98. The terminals make sliding contact with respective busbars 114 bracketed at 116 to the side walls 96. A large electric current is to be applied from these busbars to the heating wire 110 to cause the same to generate heat during the travel of the heater bar assembly along the upper flight of the package conveyor 70.

Each heater bar assembly 76 further comprises a pair of wheels 118 rotatably mounted on the respective support arms 100. When the heater bar assembly is traveling along the lower flight of the upper sealer conveyor 72, the wheels 118 make rolling engagement with the undersides of respective guide rails 120 as shown in FIGS. 5 and 6, extending parallel to the upper sealer conveyor. The guide rails 120 are rigidly supported by a pair of cross beams 122 connected between the opposed side walls 96. Thus, when traveling along the lower flight of the upper sealer conveyor 72, the heater bar assembly 76 is firmly held against upward displacement despite pressure to be exerted from the corresponding one of the anvil bar and cutter assemblies 78 via the film F.

Another wheel 124 is rotatably mounted centrally on the heater bar 98. This wheel serves the purpose of holding the heater bar 98 in a required angular position relative to the upper sealer conveyor 72 just before reaching the entrance end of the package conveyor 70, as will be later explained in further detail.

ANVIL BAR AND CUTTER ASSEMBLIES

FIGS. 6 and FIGS. 8 through 11 illustrate one representative anvil bar and cutter assembly 78 in detail. The anvil bar and cutter assembly is pivotally mounted on a crossbar 126 interconnecting the two endless chains 92 of the lower sealer conveyor 74. Mounted on the crossbar 126 via a sleeve 128 for independent pivotal motion are a pair of T shaped anvil carrier arms 130 and a pair of support arms 132. The anvil carrier arms 130 has a recess 134, FIG. 11, at its upper or outer end to immovably receive a rigid anvil support 136 bearing thereon an anvil bar 138 of suitably elastic material extending across the lower sealer conveyor 74. The anvil bar 138 is therefore pivotable about the crossbar 126.

Figure 9:
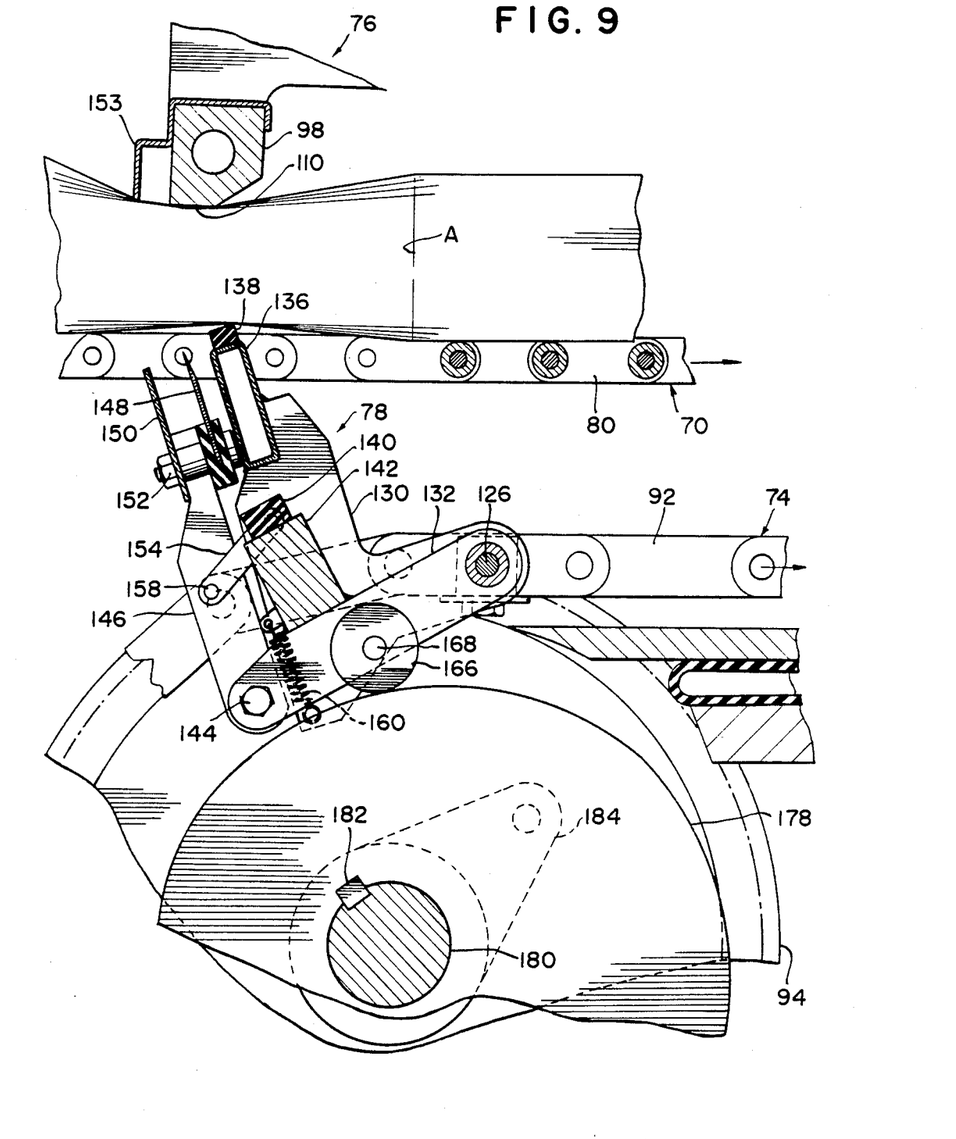
FIG. 9 is an enlarged, fragmentary vertical section through the first end sealer section, the view showing in particular one of the coacting pairs of heater bar assemblies and anvil bar and cutter assemblies just before their engagement therebetween of the folded and side sealed film at the entrance end of the package conveyor.
Figure 10:
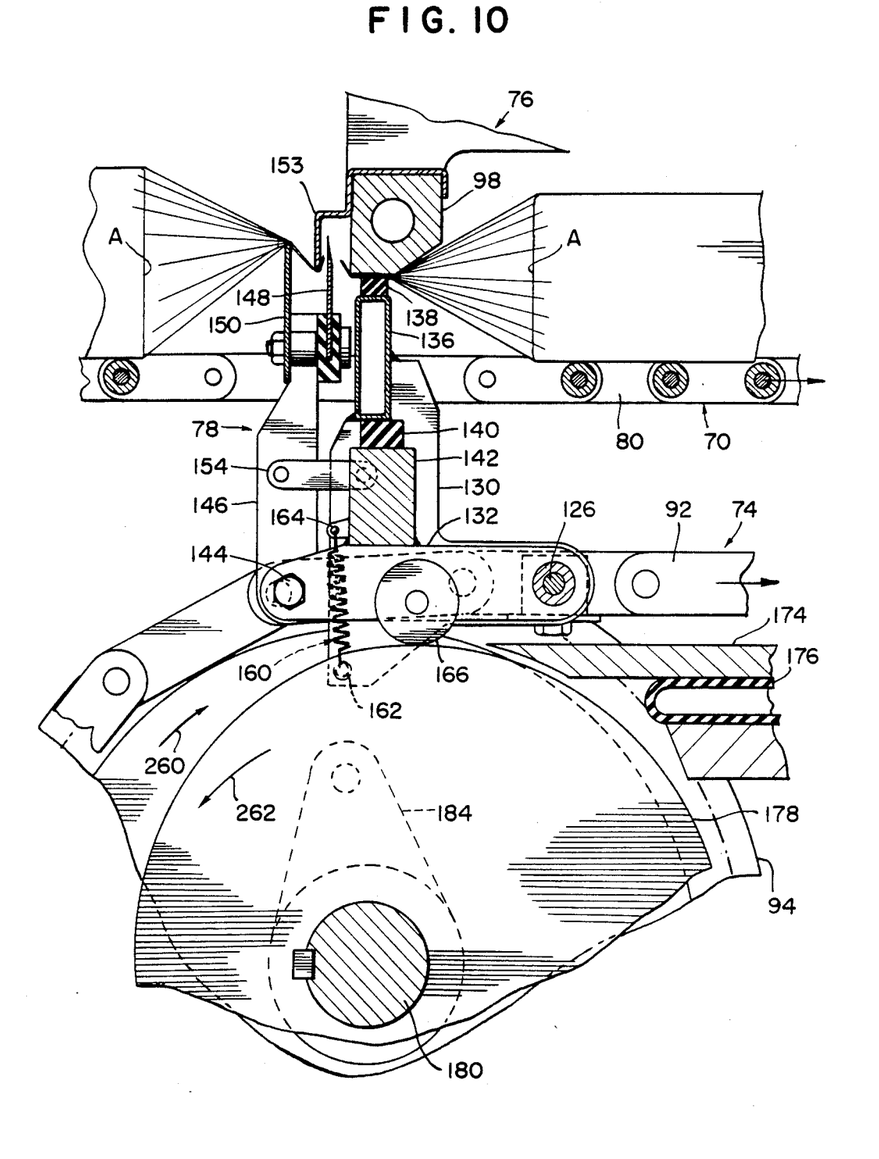
FIG. 10 is a view similar to FIG. 9 except that the film is shown engaged between the coacting pair of heater bar assembly and anvil bar and cutter assembly and further severed by the latter.
Figure 11:
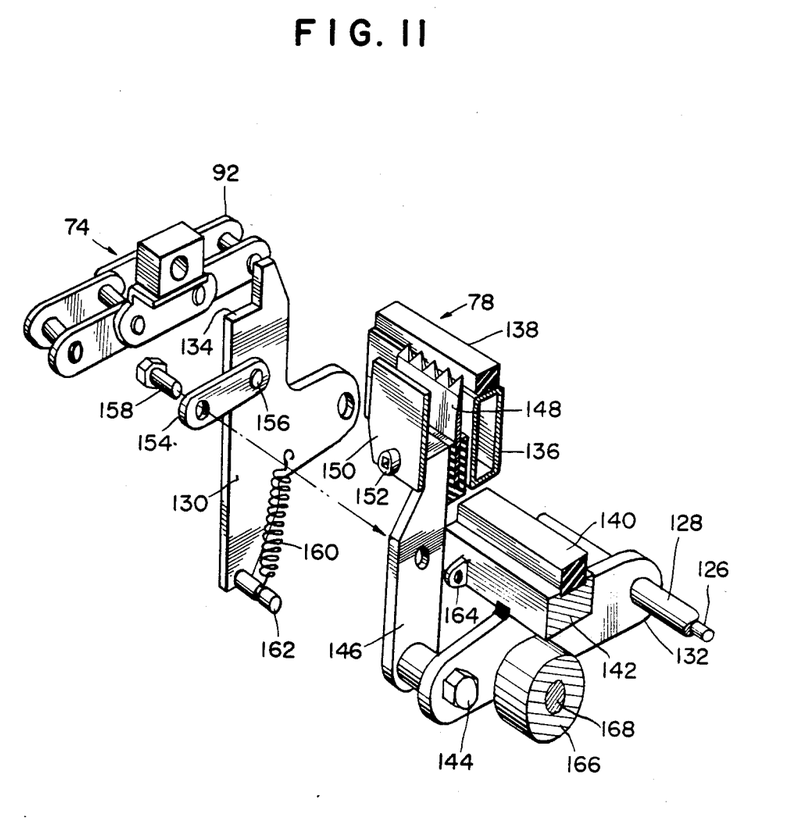
FIG. 11 is a fragmentary, exploded perspective view, with parts shown in section for illustrative convenience, of one of the anvil bar and cutter assemblies.

The support arms 132 have fixedly mounted thereon a bed 140 of rubber or like elastic material via a rigid support 142. The anvil bar 138 is to rest on the bed 140 thereby to be pressed against the corresponding heater bar 98 via the film F, as shown in FIG. 10, for heat sealing the same while traveling along the upper flight of the package conveyor 70. Pivotally pinned at 144 to the free ends of the respective support arms 132 are a pair of cutter carrier arms 146 having a sawtoothed cutter 148 and a tension plate 150 fastened thereto as by bolts 152. The cutter 148 and tension plate 150 are of approximately the same length, and both extend parallel to the anvil bar 138, with the cutter lying immediately behind the anvil bar and with the tension plate lying further behind the cutter. The cutter 148 as well as the tension plate 150 is therefore pivotable relative to the support arms 132 about the axis of the pivot pins 144 which is parallel to the axis of the crossbar 126, besides being pivotable with the support arms 132 on the crossbar. The tension plate 150 coacts with another tension plate 153 as shown in FIGS. 6, 9 and 10, rigidly mounted to the corresponding heater bar 98 to impart tension to the film F while the same is being cut by the cutter 148 at the entrance end of the package conveyor 70 as shown in FIG. 10.

A pair of links 154 are each pivotally pinned at 156 to one anvil carrier arm 130 and at 158 to one cutter carrier arm 146 so as to allow the relative motion of these arms within limits. A pair of helical tension springs 160 are each engaged at one end to a retainer pin 162 on one anvil carrier arm 130 and at another end with a hook 164 on the bed support 142. These tension springs are intended to hold the anvil bar 98 projecting outwardly of the lower sealer conveyor 74 beyond the cutter 148, as shown in FIG. 9, before they reach the entrance end of the package conveyor 70 as shown in FIG. 10. That is, when each of anvil bar and cutter assemblies 78 reaches the entrance end of the package conveyor 70, the anvil bar 98 contacts the lower surface of the film F as shown in FIG. 9 before the cutter 148 contacts it.

Each anvil bar and cutter assembly 78 further comprises a roller 166 rotatably supported between the pair of support arms 132 via a shaft 168. As seen in both FIGS. 5 and 6, an elongate rail support 170 is fixedly mounted on a pair of cross beams 172 between the side walls 96 so as to extend parallel to the lower sealer conveyor 74. The rail support 170 holds thereon a flat rail 174 via a pneumatic cushion 176 in the form of a bag of flexible or pliant material filled with air. The anvil bar and cutter assembly 78 is to roll over the rail 174 via the roller 166 along the upper flight of the package conveyor 70, with the anvil bar 138 pneumatically pressed against the corresponding heater bar 98 via the film F.

ACTUATING CAM MECHANISM

With particular reference to FIG. 12 the actuating cam mechanism 79 comprises a lift cam 178 in the form of a lobed disk on the shaft 180 of the entrance end sprockets 94 of the lower sealer conveyor 74. The roller 166 of each anvil bar and cutter assembly 78 rides on the lift cam 178 when turning around the entrance end sprockets 94 and so acts as a cam follower. The lift cam 178 functions to cause the complete anvil bar and cutter assembly 78 to pivot upwardly or outwardly of the lower sealer conveyor 74 at the entrance end of the package conveyor 70, as will be understood from a consideration of FIGS. 9 and 10. It is to be noted that the lift cam 178 is nonrotatably keyed at 182 on the shaft 180 whereas the sprockets 94 are loose on this shaft.

Also nonrotatably mounted to the shaft 180 is a lever 184 having its distal end operatively coupled to one end of a cam follower lever 186 via a link 188. The cam follower lever 186 is medially pivoted at 190 on some stationary part, not shown, of the apparatus. The other end of the cam follower lever 186 is held against a drive cam 192 via a roll 194 under the bias of a tension spring 196. Also in the form of a lobed disk, the drive cam 192 is nonrotatably keyed at 198 on the shaft 200 of the entrance end sprockets 90 of the upper sealer conveyor 72 and so is capable of joint rotation with these sprockets.

With reference to FIG. 5 the endless chains 88 and 92 of the two sealer conveyors 72 and 74 are of the same length and are comprised of the same number of links. The sprockets 90 and 94 of the sealer conveyors are also of the same diameter and have the same number of teeth. Further the shaft 202 of the exit end sprockets 90 of the upper sealer conveyor 72 is coupled to the shaft 204 of the exit end sprockets 94 of the lower sealer conveyor 74 via two intermeshing spur gears 206 and 208 of the same diameter for causing the rotation of these sprockets at the same speed and in the opposite directions. The heater bar assemblies 76 and anvil bar and cutter assemblies 78 are mounted on the respective sealer conveyors 72 and 74 at the same pitch distances and in corresponding positions. Consequently each coacting pair of heater bar assembly and anvil bar and cutter assembly meet each other at the entrance end of the package conveyor 70, travel therealong with their heater bar and anvil bar held against each other via the film F, and separate at the exit end of the package conveyor. Further the successive coacting pairs of heater bar assemblies and anvil bar and cutter assemblies come to meet at the entrance end of the package conveyor with each complete revolution of the sealer conveyor sprockets 90 and 94. This is because the pitch distances between the heater bar assemblies 76 and between the anvil bar and cutter assemblies 78 are made equal to the circumference of the sealer conveyor sprockets.

With the above construction of the sealer conveyors 72 and 74 kept in mind, reference is directed back to FIG. 12 in order to further explain the actuating cam mechanism 79. Supported in fixed relation to the upper sealer conveyor sprocket 90, the drive cam 192 acts on the cam follower lever 186 with each complete revolution of that sprocket thereby causing the lift cam 178 to rotate a preassigned angle on the lower sealer conveyor sprocket shaft 180. The intermittent rotation of the lift cam 178 is synchronized with the moments the successive coacting pairs of heater bar assemblies 76 and anvil bar and cutter assemblies 78 come to the entrance end of the package conveyor 70. Thus the actuating cam mechanism 79 actuates each anvil bar and cutter assembly 78 as the latter reaches the entrance end of the package conveyor. The manner of cam actuation of each anvil bar and cutter assembly and the consequent operation thereof will be further detailed in the operational description of the apparatus.

FIG. 12 illustrates at 210 a simicircular guide immovably supported in a concentric relation with the entrance end sprocket shaft 200 of the upper sealer conveyor 72. The aforesaid wheel 124 of each heater bar assembly 76 is to roll along this guide for preventing that assembly from pivoting downwardly into undue frictional contact with the film F just before reaching the entrance end of the package conveyor 70.

Second End Sealer Section

With reference back to FIGS. 1 and 2 the second end sealer section 26 comprises a second pair of opposed sealer conveyors 212 and 214 arranged to provide therebetween a second linear track as an extension from the first linear track provided by the package conveyor 70 of the first end sealer section 24. The sealer conveyors 212 and 214 carry coacting pairs of sealer assemblies 216 and 218 respectively. The spacings between the sealer assemblies 216 on the upper sealer conveyor 212 and the spacings between the sealer assemblies 218 on the lower sealer conveyor 214 are equal to the spacings between the heater bar assemblies 76, and between the anvil bar and cutter assemblies 78, of the first end sealer section 24. Each package has its bottom end sealed at the first end sealer section 24 and its mouth end at the second end sealer section 26.

The second end sealer section of the foregoing construction is, however, not an essential feature of this invention. No more detailed description of this section is therefore considered necessary.

A possible alternative to the illustrated construction of the second end sealer section is a rotary vacuum packaging machine comprising an annular row of vacuum enclosures capable of accepting the successive incomplete packages from the first end sealer section 24. Within each vacuum enclosure the package has its interior evacuated and has its mouth end heat sealed.

Drive Mechanism

As shown in FIG. 2, the drive mechanism 28 includes an electric motor 220 provided with a speed reducer 222. The output shaft 224 of this motor drive unit has two sprockets 226 and 228 fixedly mounted thereon. The sprocket 226 is chained at 230 to a well known speed changer 232, which in turn is chained at 234 to a shaft 236 having mounted thereon the drive pulley of the endless belt 64 of the film feed mechanism 44 at the folder section 22. The other sprocket 228 on the motor drive unit output shaft 224 is chained at 238 to the shaft 204 of the drive sprocket 94, as shown in FIG. 5, of the lower sealer conveyor 74 at the first end sealer section 24. As has been mentioned in connection with FIG. 5, the rotation of the lower sealer conveyor drive sprocket 94 is imparted to the drive sprocket 90 of the upper sealer conveyor 72 via the intermeshing spur gears 206 and 208.

The rotation of the sealer conveyor drive shaft 204 is further transmitted to the drive shaft 240 of the infeed conveyor 30 at the infeed section 20 via a chain 242, to the drive shaft 244 of the package conveyor 70 at the first end sealer section 24 via chains 246 and 248, and to the drive shaft 250 of the sealer conveyors 212 and 214 at the second end sealer section 26 via a chain 252. There is provided a timing adjustment device 254 for adjusting the timing of the rotation of the second sealer conveyors 212 and 214 with respect to the rotation of the three conveyors 70, 72 and 74 of the first end sealer section 24. The device 254 comprises a gear mechanism or a coupling mechanism which is well known.

OPERATION

For packaging desired articles A by the illustrated apparatus the motor 220 of the drive mechanism 28 may be set into rotation. The motor 220 drives the infeed conveyor 30, package conveyor 70, and first pair of sealer conveyors 72 and 74 at the same speed. The speeds of the film feed mechanism 44 and the second pair of sealer conveyors 212 and 214 are variable up to predetermined limits by the respective speed changers 232 and 254. To facilitate description, however, it is first assumed that the film feed mechanism 44 and second pair of sealer conveyors 212 and 214 operate at the same speed as the infeed conveyor 30 and the three first end sealer section conveyors.

Pulled by the pair of endless belts 62 and 64 of the film feed mechanism 44, the continuous length of heat film F enters the folder 40 thereby to be folded into approximately tubular shape. The articles A to be packaged are transported by the infeed conveyor 30 at the same speed as the film F and are pushed by the pushers 36 thereon into the film being folded by the folder 40. The pitch distances between the pushers 36 are determined in accordance with those of the articles A thus introduced into the folded film F.

Figure 13:
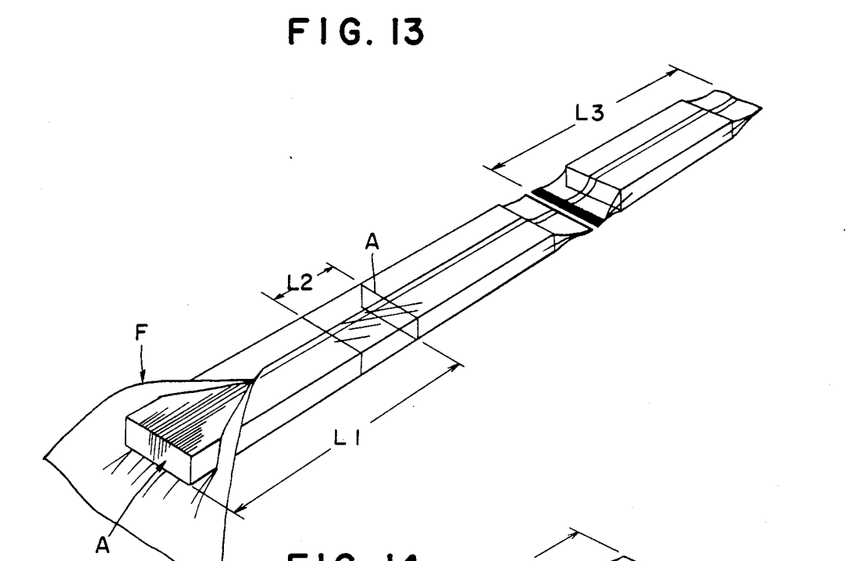
FIG. 13 is a perspective view explanatory of the way how relatively large size articles are packaged by the apparatus of FIGS. 1 and 2.

FIG. 13 illustrates the way how the articles A are packaged by this apparatus. The pitch distances L1 between the articles A received in the folded film F are equal to those of the pushers 36 on the infeed conveyor 32. The pitch distances between the pushers 36 are so determined in relation to the maximum size of articles to be packaged as to provide the spacings L2 between the articles necessary for heat sealing both ends of each package.

As clearly shown in FIG. 4, the opposite side edges F1 and F2 of the folded film acquire a lapping relation over the folder 40. The electric heater 54 seals the lapping side edges of the film by heat and pressure into a continuous side seam. The film feed mechanism 44 transfers the folded and side sealed film, together with the articles A received therein at the constant spacings L2, onto the package conveyor 70 of the first end sealer section 24.

At the entrance end of the package conveyor 70, the film is engaged, at points intermediate the articles A received therein, between the successive coacting pairs of heater bar assemblies 76 and anvil bar and cutter assemblies 78. As has been stated, the pitch distances between the heater bar assemblies 76 and between the anvil bar and cutter assemblies 78 are equal to those of the pushers 36 on the infeed conveyor 30. Further the speed of the sealer conveyors 72 and 74 is equal to that of the infeed conveyor 30. Accordingly the length L3 (FIG. 13) of the film F engaged between every two adjoining pairs of heater bar assemblies and anvil bar and cutter assemblies is equal to the pitch distance L1 between any two neighboring articles A received in the folded film.

A study of FIGS. 9 and 10 will make clear how each coacting pair of heater bar assembly 76 and anvil bar and cutter assembly 78 engage the film F at the entrance end of the package conveyor 70. FIG. 9 shows one pair of such assemblies in a state just before reaching the entrance end of the package conveyor, with the two assemblies turning around the sprockets of the sealer conveyors. Although the film F is traveling at the same speed as the sealer conveyors, the heater bar assembly 76 and anvil bar and cutter assembly 78 are moving along the circular paths whereas the film is traveling rectilinearly. Consequently the traveling speed of the heater bar 98 and anvil bar 138 is higher than that of the film F. The film might be broken because of this difference in speed if it were engaged between the heater bar and anvil bar without retracting them away from each other by the means provided for that purpose in the illustrated apparatus.

Provided for preventing the heater bar assembly 76 from pivoting too downwardly while the same is turning around the entrance end sprockets of the upper sealer conveyor 72 is the semicircular guide 210 shown in FIG. 12, fixedly supported in concentric relation with that sprocket. The wheel 124 of the heater bar assembly 76 rolls along this guide to hold the assembly away from the film up to the limit determined by the stop pins 108 (FIG. 7) loosely received in the cups 106. The anvil bar and cutter assembly 78, on the other hand, rolls over the reduced diameter portion of the lift cam 178, as shown in FIG. 9, while turning around the entrance end sprockets of the lower sealer conveyor 74. The reduced diameter portion of the lift cam 178 holds the anvil bar and cutter assembly 78 pivoted in a counterclockwise direction, as viewed in FIG. 9, under its own weight, so that this assembly also avoids making excessive frictional contact with the film F. It is thus seen that the coacting pair of heater bar assembly 76 and anvil bar and cutter assembly 78 are both held retracted away from the film F while following the circular paths around the entrance end sprockets of the sealer conveyors 72 and 74.

At the entrance end of the package conveyor 70, or at the point of transition from the circular to linear paths of the sealer conveyors 72 and 74, the pair of wheels 118 of the heater bar assembly 76 come into rolling engagement with the undersides of the guide rails 120 (FIG. 6). These rails function to positively hold the heater bar 98 against upward displacement. Concurrently the actuating cam mechanism 79 (FIG. 12) operates as follows to cause upward displacement of the anvil bar and cutter assembly 78.

The drive cam 192 of the actuating cam mechanism 79 causes the cam follower lever 186 to turn in a clockwise direction, as viewed in FIG. 12, against the force of the tension spring 196. The result is the rotation of the lift cam 178 in a counterclockwise direction, with the result that its lobe acts on the cam follower roll 166 to cause upward motion of the anvil bar and cutter assembly 78. As best shown in FIG. 10, the entrance end sprockets 94 of the lower sealer conveyor 74 are turning clockwise, as indicated by the arrow 260, around the shaft 180 on which they are mounted with a running fit, whereas the lift cam 178 is turned counterclockwise, as indicated by the arrow 262, by the drive cam 192 around the same shaft 180 to which it is keyed. Since the lift cam 178 and the cam follower roll 166 are moving in the opposite directions, the anvil bar and cutter assembly 78 is pivoted upwardly at a high speed.

As the anvil bar and cutter assembly 78 is cammed upwardly as shown in FIG. 10, the bed 140 on its support arms 132 pushes up the anvil bar 138 via its support 136 thereby causing the anvil bar to engage the folded and side sealed film F between itself and the associated heater bar 98. At the same time the cutter 148 cuts the film F being tensed by the coacting pair of tension plates 148 and 153. It will now be seen that the severed piece of film F, containing one article A, has its trailing end engaged between the heater bar 98 and anvil bar 138.

Then the cam follower roll 166 rides onto the flat rail 174 and rolls thereon as the anvil bar and cutter assembly 78 travels along the upper flight of the package conveyor 70. The heater bar assembly 76, on the other hand, travels along the upper flight of the package conveyor 70 with its wheels 118 in rolling engagement with the overlying guide rails 120. Since the rail 174 is floatingly supported on the pneumatic cushion 176, the anvil bar 138 is held pneumatically pressed via the film F against the heater bar 98 which is being held against upward displacement by the guide rails 120. Thus kept under pressure, the trailing bottom end of the severed piece of film F is heat sealed as an electric current flows through the wire 110 on the underside of the heater bar 98. The film is held engaged between the coacting pair of heater bar 98 and anvil bar 138 until they reach the exit end of the package conveyor 70, by which time the heat sealed end of the film may cool to a certain degree.

The successive pieces of folded and side sealed film F, each having had its bottom end sealed as above at the first end sealer section 24, are then transferred to the second end sealer section 26. At this section the leading mouth ends of the film pieces are heat sealed by the coacting pairs of sealer assemblies 216 and 218.

The operation of this apparatus has so far been described on the assumption that the continuous length of film F is fed by the film feed mechanism 44 at the same speed as the conveyoer 30 of the infeed section 20 and the conveyors 70, 72 and 74 of the first end sealer section 24. The length L3 of each package produced as shown in FIG. 13 is therefore equal to the pitch distance L1 between any two adjoining articles A as they are introduced into the film being folded, or to the pitch distances between the successive coating pairs of heater bars 98 and anvil bars 138.

As has been stated, however, the operating speed of the film feed mechanism 44 may be reduced for packaging smaller sized articles without wasteful use of the film. The speed changer 232 in FIG. 2 may be manually operated for the reduction of the film speed.

Figure 14:
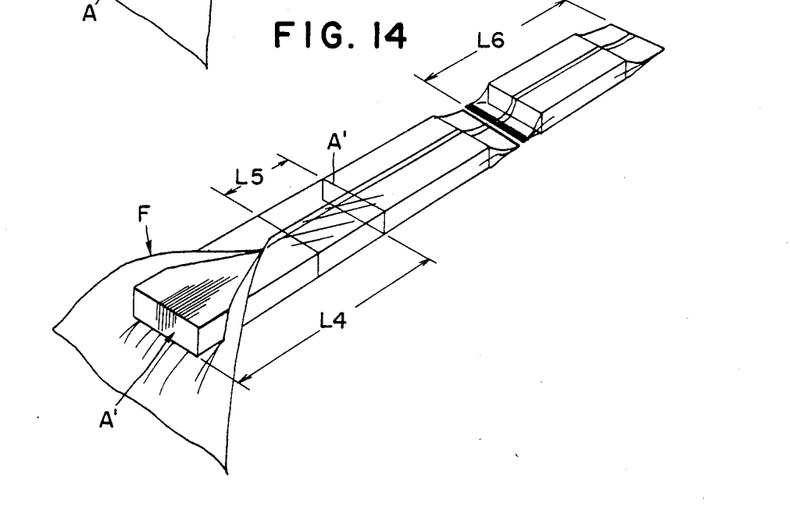
FIG. 14 is a perspective view explanatory of the way how relatively small size articles are packaged by the same apparatus, FIGS. 13 and 14 being both further explanatory of the way how the apparatus produces packages having a length suiting the size of the articles packaged.

With reference again to FIG. 13 it will be understood that the spacings L2 between the articles A within the folded film F become smaller if the film feed speed is reduced while the speed of the infeed conveyor 30 remains unchanged. The pitch distances L1 between the articles and the length L3 of each package become correspondingly smaller. Thus, in FIG. 14, smaller sized articles A' are shown being packaged by the same apparatus with only the film feed speed reduced. The pitch distances L4 between the articles A' received in the folded film F become smaller as aforesaid. But since the articles A' are themselves smaller than the articles A, the spacings L5 therebetween can be left equal to the spacings L2 between the articles A, such spacings being necessary for heat sealing the opposite ends of each package. There can thus be produced packages each having a reduced length L6 suiting the smaller size of the article A'. The following is a more detailed discussion of the way the folded and side sealed film F containing the articles A' is processed into packages at the two end sealer sections 24 and 26.

The film feed mechanism 44 delivers the folded and side sealed film F to the first end sealer section 24 at a speed less than the that of the package conveyor 70 and sealer conveyors 72 and 74. It is understood that the speeds have been adjusted in relation to each other so that, at the entrance end of the package conveyor 70, each coacting pair of heater bar assembly 76 and anvil bar and cutter assembly 78 engage the film F therebetween at a point intermediate the articles A' enclosed therein. Despite the speed difference the heater bar 98 and anvil bar 138 exert no excessive frictional forces on the film F just before engaging the same at the entrance end of the package conveyor 70 as the heater bar and anvil bar are then both held retracted, as has been explained in connection with FIG. 9. The cam mechanism 79 actuates the anvil bar and cutter assembly 78 at the moment the heater bar 98 and anvil bar 138 come to exact register with each other at the entrance end of the package conveyor 70. Thereupon, as illustrated in FIG. 10, the film F is engaged between heater bar 98 and anvil bar 138 and is cut by the cutter 148.

As has been assumed above, the film feed mechanism 44 is now feeding the continuous length of film F at the selected speed less than the preassigned speed of the package conveyor 70. Consequently, on being cut off from the continuous length of film, the piece of film enveloping one small size article A' travels faster on the package conveyor 70 and so moves away from the continuous film length, as best illustrated in FIG. 5. The trailing end of the severed piece of film is heat sealed as above during its travel on the package conveyor 70.

Then the successive severed pieces of film are transferred to the second end sealer section 26. Since the film pieces containing the small size articles A' are shorter than those containing the larger articles A, the rotational timing of the second pair of sealer conveyors 212 and 214 with respect to the three conveyors 70, 72 and 74 of the first end sealer section 24 should be readjusted to cause the coacting pairs of sealer assemblies 216 and 218 thereon to engage the leading mouth ends of the film pieces at the entrance end of the sealer conveyors. The timing adjustment device 254 shown in FIG. 2 is provided to that end.

Experiment was made with a packaging line constructed in accordance with the teachings of the present invention. The first end sealer section of the packaging line had five coacting pairs of heater bar assemblies and anvil bar and cutter assemblies as in the embodiment disclosed herein. The packages produced when the film feed speed was set equal to the speed of the three conveyors of the first end sealer section had the greatest length of 560 millimeters, which of course was the same as the pitch distances between the heater bar assemblies 76 and between the anvil bar and cutter assemblies 78. The shortest packages produced, when the film feed speed was decreased to a preset minimum, were 200 millimeters long. There was thus a difference of as much as 360 millimeters between the longest and the shortest packages formed by the same packaging line. A variety of intermediate size packages could of course be obtained.

Possible Modifications

It is to be understood that the foregoing detailed disclosure is by way of example only and is not to impose limitations upon the invention. A variety of modifications of the disclosed embodiment will occur to one skilled in the art within the broad teaching hereof. The following is a brief list of such possible modifications:
1. The package conveyor may take the form of a belt conveyor having a series of apertures defined therein at constant spacings.
2. The sealer conveyors may also be other than chain conveyors.
3. The side edges of the film may meet and be heat sealed on the underside of the folder.
4. The energy of a fluid under pressure or the instantaneous restoring force of a spring may be used for actuating the anvil bar and cutter assemblies when they reach the entrance end of the package conveyor 70.
5. Impulse sealing by high voltage electric current may be employed at the end sealer section or sections.

What is claimed is:
1. A method of packaging articles of various sizes with a continuous length of heat sealable film, which method comprises:
   (a) continuously folding into approximately tubular shape the length of heat sealable film being fed longitudinally at a speed selected in accordance with the size of the articles to be packaged;
   (b) successively introducing the articles into the film being folded, at a constant rate regardless of the selected speed at which the film is being fed, there being constant longitudinal spacings between the articles received in the folded film;
   (c) heat sealing the side edges of the folded film over the successive articles received therein;
   (d) transferring the side sealed film, together with the articles contained therein, onto a linear track for transportation thereon at a preassigned speed, the selected speed at which the film is fed while being folded and receiving the articles being determined in accordance with the preassigned speed of transportation of the article-containing film along the linear track;
   (e) engaging the side sealed film, at points intermediate the articles contained therein, by an endless row of end sealing means at an entrance end of the linear track, the end sealing means being movable along the linear track at the preassigned speed;
   (f) cutting off the side sealed film at a point immediately behind each end sealing means approximately concurrently with the engagement thereof by the end sealing means; and
   (g) heat sealing one end of each severed piece of film, having one article received therein, by the end sealing means traveling in engagement therewith along the linear track.
2. The packaging method of claim 1 wherein the end sealing means hold the film at least under pressure throughout the linear track.
3. The packaging method of claim 1 which further comprises:
   (a) transferring each severed piece of side and end sealed film, having one article received therein, from the first recited to a second linear track for transportation thereon at a speed determined in accordance with the selected speed at which the film is fed while being folded and receiving the articles; and
   (b) heat sealing another end of each piece of film during travel along the second linear track.
4. Apparatus for packaging articles of various sizes with a continuous length of heat sealable film, the apparatus comprising:
   (a) feed means for feeding the continuous length of heat sealable film at a speed selected in accordance with the size of the articles to be packaged;
   (b) a folder for folding into approximately tubular shape the film being fed at the selected speed;
   (c) infeed means for successively introducing the articles of the desired size into the film being folded, at a constant rate regardless of the selected speed at which the film is being fed by the feed means, there being constant longitudinal spacings between the articles received in the folded film;
   (d) side sealing means for heat sealing the side edges of the folded film over the successive articles received therein;
   (e) a package conveyor providing a linear track having an entrance end arranged to receive the side sealed film together with the articles received therein for transporting the same along the linear track at a preassigned speed, the selected speed at which the film is fed by the feed means being determined in accordance with the preassigned speed of the package conveyor, the package conveyor having a series of apertures formed therein at constant longitudinal spacings;
   (f) first and second sealer conveyors disposed on upper and lower sides of the linear track of the package conveyor and running parallel thereto at the same speed and in the same direction therewith;
   (g) a plurality of heater bar assemblies operatively mounted on the first sealer conveyor at constant longitudinal spacings, each heating bar assembly including a heater bar extending transversely of the first sealer conveyor;
   (h) a plurality of anvil bar assemblies operatively mounted on the second sealer conveyor at constant longitudinal spacings, each anvil bar assembly including an anvil bar extending transversely of the second sealer conveyor, the heater bars of the heater bar assemblies coacting with the respective anvil bars of the anvil bar assemblies to engage the side sealed film, at points intermediate the articles received therein, at the entrance end of the package conveyor through the respective apertures therein and to end seal the film by heat and pressure during travel along the linear track of the package conveyor; and
   (i) cutter means for cutting off the side sealed film at a point immediately behind each coacting pair of heater bar and anvil bar approximately concurrently with the engagement thereof by the coacting pair of heater bar and anvil bar.
5. The packaging apparatus of claim 4 wherein the feed means comprises a pair of opposed endless belts disposed downstream of the folder for frictionally en- gaging therebetween the folded and side sealed film having the articles received therein.

6. The packaging apparatus of claim 4 wherein the folder is adapted to fold the opposite side edges of the continuous length of heat sealable film into an overlapping relation with each other, and wherein the side sealing means overlies the folder for heat sealing the side edges of the film into a lap seam.

7. The packaging apparatus of claim 4 wherein the infeed means comprises a conveyor having a series of pushers arranged thereon at constant longitudinal spacings for pushing the successive articles into the film being folded by the folder.

8. The packaging apparatus of claim 4 wherein the heater bar of each heater bar assembly is mounted on the first sealer conveyor for pivotal motion about an axis extending transversely of the first sealer conveyor, and wherein the apparatus further comprises:
 (a) means for limiting the pivotal motion of each heater bar relative to the first sealer conveyor;
 (b) first guide means for holding the heater bars out of frictional contact with the film before reaching the entrance end of the package conveyor; and
 (c) second guide means for holding the heater bars against the respective anvil bars via the film during travel along the linear track of the package conveyor.

9. The packaging apparatus of claim 4 wherein the anvil bar assemblies are structurally associated with the cutter means to form anvil bar and cutter assemblies, each anvil bar and cutter assembly comprising:
 (a) support means mounted on the second sealer conveyor for pivotal motion about a first axis extending transversely thereof;
 (b) cutter carrier means coupled to the support means for pivotal motion about a second axis parallel to the first axis;
 (c) a cutter carried by the cutter carrier means for cutting off the film;
 (d) anvil carrier means carrying the anvil bar and mounted on the second sealer conveyor for pivotal motion about the first axis;
 (e) link means interconnecting the cutter carrier means and the anvil carrier means so as to allow relative pivotal motion thereof within limits; and
 (f) resilient means acting between the support means and the anvil carrier means so as to normally hold the anvil bar outwardly of the second sealer conveyor beyond the cutter.

10. The packaging apparatus of claim 9 further comprising an actuating mechanism for pivoting the successive anvil bar and cutter assemblies outwardly of the second sealer conveyor to cause the anvil bars to engage the side sealed film between themselves and the heater bars, and to cause the cutters to cut the film, at the entrance end of the package conveyor.

11. The packaging apparatus of claim 10 wherein each anvil bar and cutter assembly further comprises a bed fixedly mounted on the support means to allow the anvil bar to rest thereon when the anvil bar and cutter assembly is pivoted outwardly of the second sealer conveyor by the actuating mechanism.

12. The packaging apparatus of claim 10 wherein the actuating mechanism comprises a lift cam rotatable relative to the anvil bar and cutter assemblies about the axis of a terminal wheel of the second sealer conveyor for acting on the successive anvil bar and cutter assemblies.

13. The packaging apparatus of claim 12 wherein the lift cam of the actuating mechanism is mounted on the same shaft as the terminal wheel of the second sealer conveyor for rotation independently of the terminal wheel, and wherein the actuating mechanism further comprises:
 (a) a drive cam capable of joint rotation with a terminal wheel of the first sealer conveyor; and
 (b) linkage means acted upon by the drive cam to cause the lift cam to rotate through a predetermined angle in a predetermined direction when each anvil bar and cutter assembly reaches the entrance end of the package conveyor.

14. The packaging apparatus of claim 13 wherein the predetermined direction of rotation of the lift cam is opposite to the direction of rotation of the terminal wheel of the second sealer conveyor.

15. The packaging apparatus of claim 12 further comprising:
 (a) a cam follower roll rotatably mounted to the support means of each anvil bar and cutter assembly for rolling engagement with the lift cam of the actuating mechanism, the lift cam acting on each anvil bar and cutter assembly via the cam follower roll; and
 (b) a guide rail extending parallel to the linear track of the package conveyor, the cam follower roll rolling over the guide rail during the travel of each anvil bar and cutter assembly along the linear track.

16. The packaging apparatus of claim 15 further comprising a pneumatic cushion floatingly supporting the guide rail thereon for holding the anvil bars of the anvil bar and cutter assemblies urged against the heater bars of the heater bar assemblies via the film during the travel thereof along the linear track of the package conveyor.

17. The packaging apparatus of claim 4 further comprising drive means for driving the feed means, the infeed means, the package conveyor, and the first and second sealer conveyors, the drive means including means for changing the speed at which the feed means feeds the continuous length of film depending upon the size of the articles to be packaged.

18. The packaging apparatus of claim 4 further comprising:
 (a) an additional pair of opposed sealer conveyors for receiving therebetween the successive severed pieces of film, each containing one article, from the package conveyor; and
 (b) means on the additional pair of sealer conveyors for heat sealing another end of each piece of film.

19. The packaging apparatus of claim 18 further comprising means for changing the rotational timing of the additional pair of sealer conveyors with respect to the rotation of the package conveyor.

* * * * *